United States Patent [19]

Nierenberg et al.

[11] 3,973,928

[45] Aug. 10, 1976

[54] APPARATUS FOR DIFFUSION SEPARATION

[75] Inventors: William A. Nierenberg, Ann Arbor, Mich.; Rex B. Pontius, Rochester, N.Y.

[73] Assignee: The United States of America as represented by the United States Energy Research and Development Administration, Washington, D.C.

[22] Filed: Jan. 28, 1949

[21] Appl. No.: 73,304

[52] U.S. Cl. .................................... 55/16; 55/158
[51] Int. Cl.² ......................................... B01D 53/22
[58] Field of Search ............ 183/2.2, 115; 23/204.1, 23/204.2; 55/16, 158

[56] References Cited
UNITED STATES PATENTS

| | | | |
|---|---|---|---|
| 2,609,059 | 9/1952 | Benedict | 55/16 |
| 2,617,493 | 11/1952 | Jones | 55/16 |

*Primary Examiner*—John Adee
*Attorney, Agent, or Firm*—Dean E. Carlson; Leonard Belkin

EXEMPLARY CLAIM

1. The method of testing the separation efficiency of porous permeable membranes which comprises causing a stream of a gaseous mixture to flow into contact with one face of a finely porous permeable membrane under such conditions that a major fraction of the mixture diffuses through the membrane, maintaining a rectangular cross section of the gaseous stream so flowing past said membrane, continuously recirculating the gas that diffuses through said membrane and continuously withdrawing the gas that does not diffuse through said membrane and maintaining the volume of said recirculating gas constant by continuously introducing into said continuously recirculating gas stream a mass of gas equivalent to that which is continuously withdrawn from said gas stream and comparing the concentrations of the light component in the entering gas, the withdrawn gas and the recirculated gas in order to determine the efficiency of said membrane.

4 Claims, 6 Drawing Figures

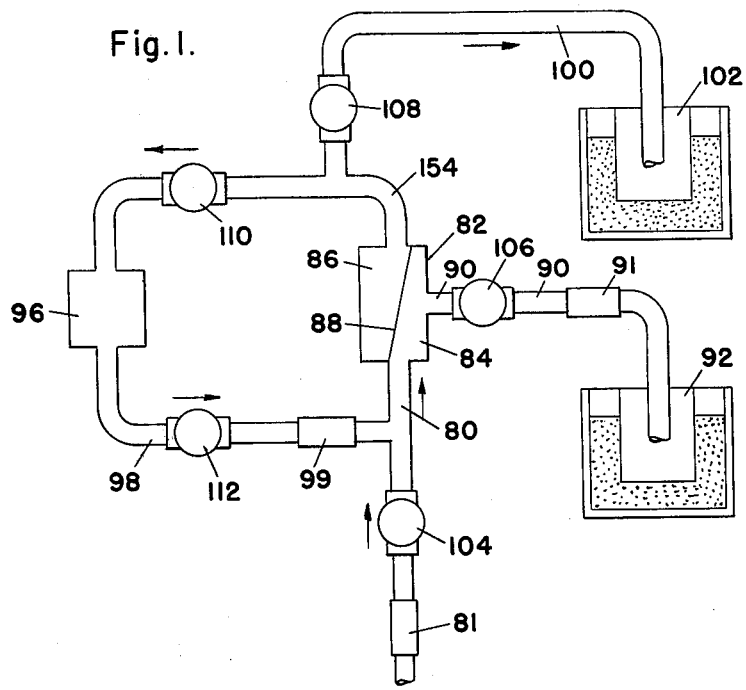
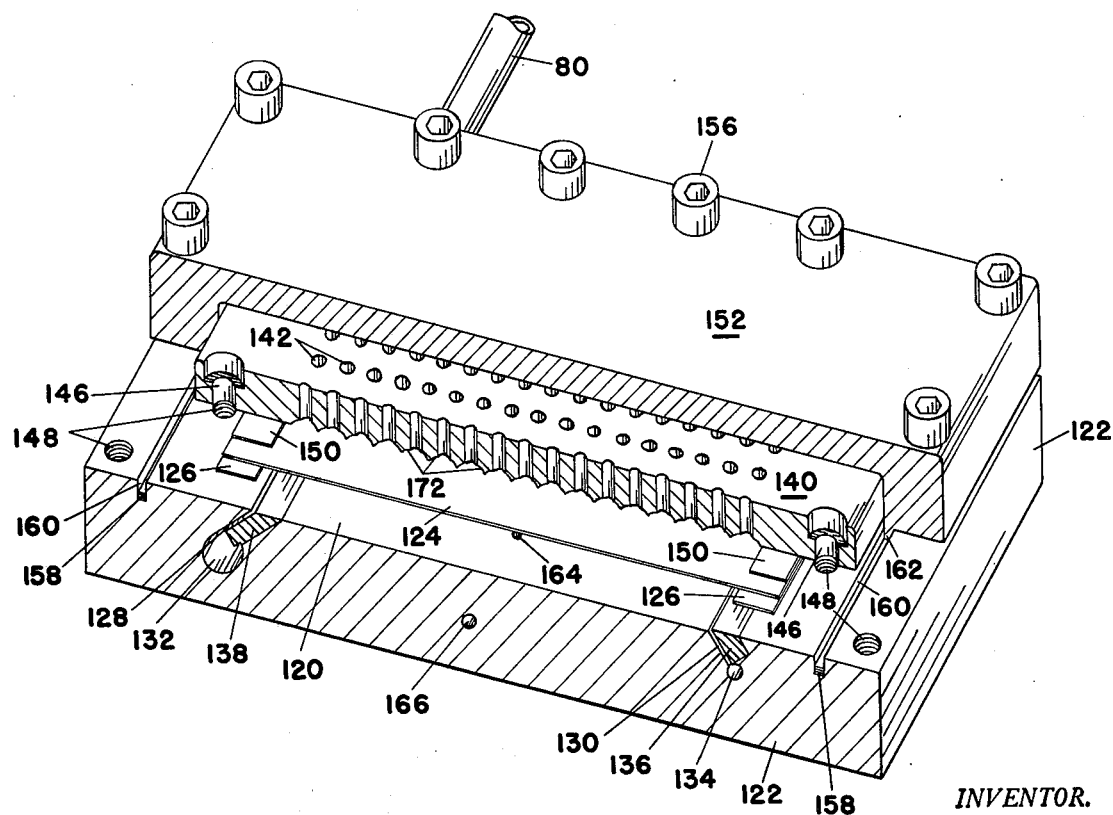

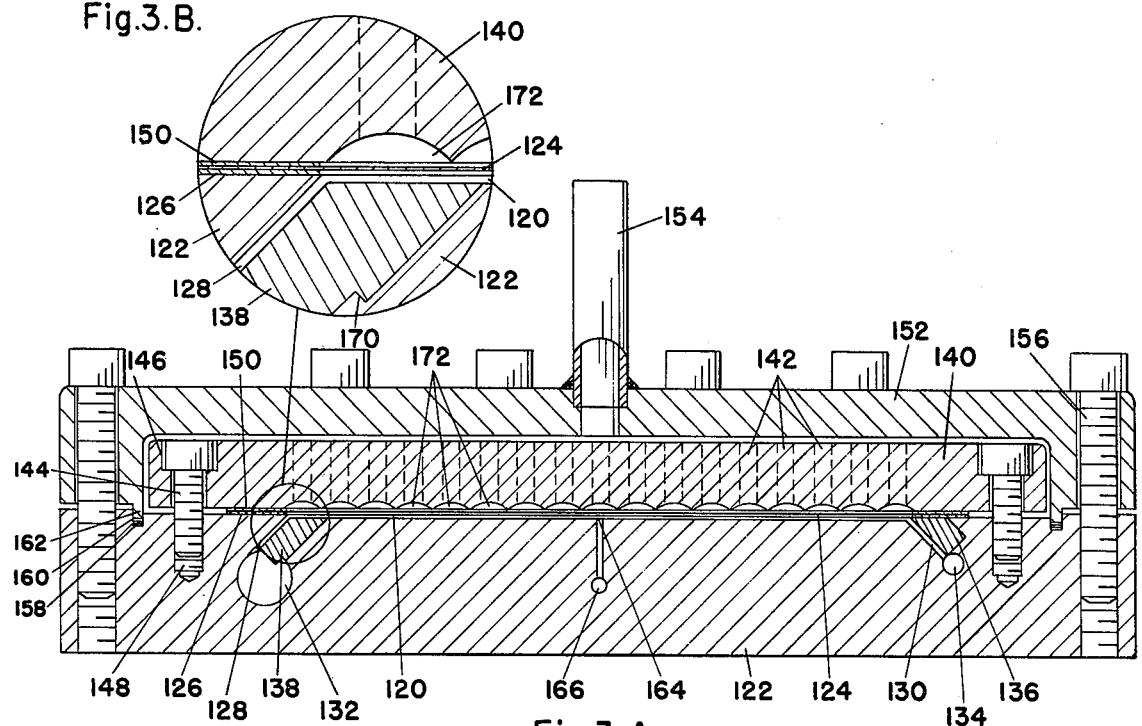
Fig.3.B.
Fig.3.A.
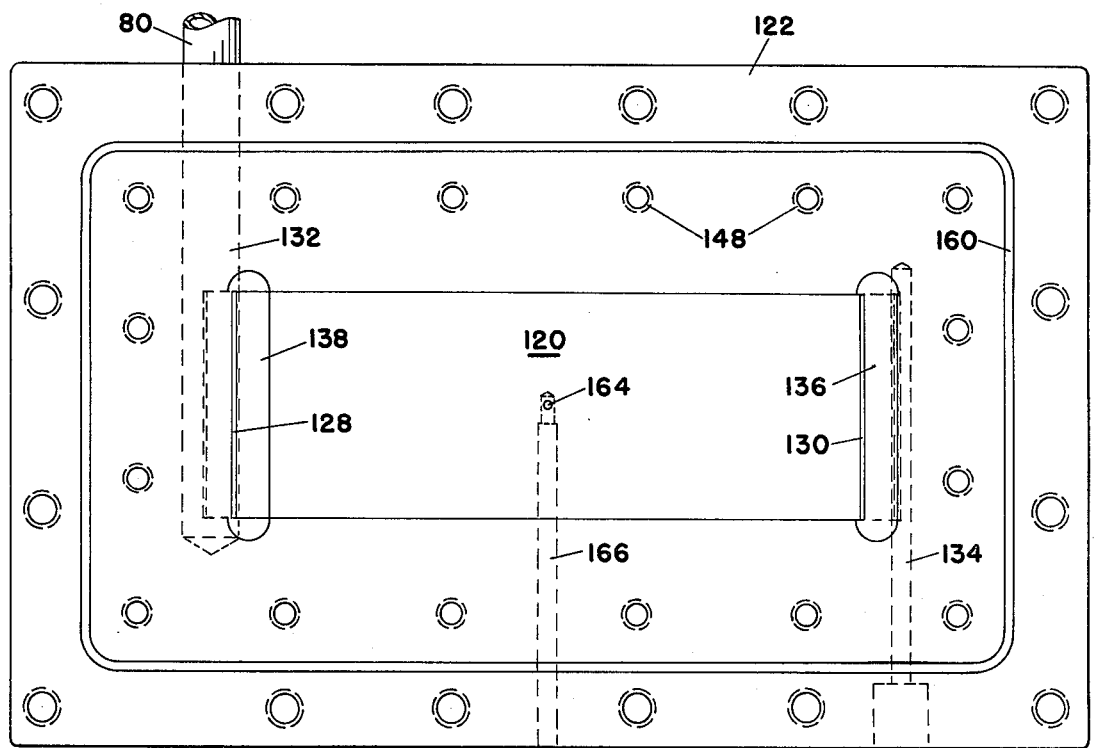
Fig.4.
INVENTOR.
WILLIAM A. NIERENBERG
REX B. PONTIUS
BY
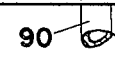

APPARATUS FOR DIFFUSION SEPARATION

This invention relates to a method and apparatus for separating the components of a gaseous mixture by diffusion through a finely porous, permeable metal membrane. The method and apparatus of the invention are particularly well adapted for use in connection with the diffusional separation of different isotopic species of an element or compound and will be so described, although as the description proceeds it will become apparent that they may be used equally well in connection with the separation of other gaseous mixtures.

In recent years, a number of isotopes of elements have been discovered which possess interesting and useful characteristics and it has become desirable to develop methods of separating and concentrating such isotopes so that they may be studied and used. Because of the chemical identity of the isotopes of an element, the problem of separating isotopes is a difficult one. Various methods have been previously proposed for effecting such a separation, among which is the so-called diffusion method wherein a gaseous mixture of isotopic species of an element or compound of the element is passed into contact with a finely porous, permeable membrane and a portion of the gaseous mixture is caused to flow through the membrane. Under such circumstances, the fraction of the mixture that passes through the membrane is enriched somewhat with respect to the lighter component of the mixture. The extent to which enrichment takes place in a single diffusion stage, i.e., a single passage of the mixture into contact with the diffusion membrane is usually relatively small and several methods of multiplying this effect have been considered.

The maximum theoretical separation of te constituents of gaseous mixtures obtainable by a single pass into contact with a diffusion membrane is given by the equation $$\alpha \text{ ideal} = \sqrt{\frac{M_1}{M_2}}$$

where:

$M_1$ is the molecular weight of the heavier component of said mixture, and $M_2$ is the molecular weight of the lighter component of said mixture.

In the case of a gaseous mixture of $UF_6$ containing isotopes of uranium, $U^{235}$ and $U^{238}$, the maximum theoretical separation is $$\alpha \, UF_6 = \sqrt{\frac{352}{349}} = 1.00429$$

The actual separation effected by a single pass of such a mixture into contact with a diffusion membrane is considerably less than that given by the ideal separation.

In accordance with one proposal for increasing such separation, a number of diffusion stages are interconnected in series in a so-called cascade in such a manner that the fraction of gas diffusing through the membrane passes on to a succeeding or higher stage of the cascade and the fraction of the gas that does not diffuse through the membrane is recycled to an earlier or lower stage of the cascade. Gaseous mixture of normal isotopic abundance may be fed to an appropriate point in the middle of the cascade, gas enriched with respect to the lighter component may be withdrawn from the top of the cascade and gas enriched with respect to the heavier constituent of the mixture may be withdrawn from the bottom of the cascade.

In cases where separation of the isotopes is particularly difficult, as, for example, where it is desired to separate the isotopes of uranium by diffusional separation of uranium hexafluoride, a very large number of diffusion stages are required and hence a considerable quantity of the process gas is held up in the system at any given time. In other words, a relatively large quantity of the process gas is required in order to operate the cascade at all. There are numerous instances where such a large quantity of the gaseous mixture may not be available and in such cases it is necessary that a different type of separative method be used.

In the construction of a cascade such as that described above, the manufacture of suitable porous, permeable membranes presents a major problem. In order to operate efficiently as a diffuser-separator, such membranes must have exceedingly fine holes, i.e., holes that are smaller in diameter than the wave length of visible light. As an incident of the manufacture of such membranes, it is desirable to have a simple and satisfactory method of testing their separation efficiency. The membranes may be tested in a variety of ways such as, for example, by passing a gas mixture of known composition into contact with the membrane and determining the change in composition that occurs as the gas passes through the membrane.

in cases where the membrane is to be used in contact with an isotopic gaseous mixture which is either difficultly separable or highly corrosive, or both, it is frequently desirable that the membrane be tested in contact with the process gas that is to be used in the diffusion separation cascade. In making a test of this character, a special problem is presented where a process gas such as uranium hexafluoride is used because of the very small change in composition that occurs in a single pass through the membrane. This change in composition may be of the same order of magnitude as the probable error in the analytical method used to analyze the gas mixture. Accordingly, it is important that the testing method used be of such a character as to produce a relatively large separation so that the normal analytical errors do not produce an unduly large error in the final result.

It is also important that the method used be such that it can be carried out in apparatus of conveniently small size and within a reasonable length of time. One problem that is encountered in attempting to test permeable membranes under these conditions arises out of the self-diffusive tendency of the gas. As the gaseous mixture flows across the face of the membrane and a portion of the gas diffuses through the membrane, the velocity of the stream tends to decrease. If the diffused gas constitutes a large proportion of the total gas fed to the membrane, the velocity of the stream may drop to the point where back diffusion in a direction opposite to the direction of flow of the stream becomes significantly large. Such back diffusion decreases the overall separation obtainable.

In order to minimize the effect of back diffusion, it has been customary to use a relatively low cut, i.e., to operate under such conditions that only a relatively small proportion of the gas is caused to diffuse through the membrane so that the decrease in velocity of the stream is small. However, when such a low cut is used the separative work done per unit quantity of mixture fed to the membrane is substantially reduced.

One method of increasing the separation which may be effected by use of single stage diffusion systems comprises passing a gaseous mixture through a channel at least one wall of which is a porous permeable membrane, said channel being of continuously decreasing cross section in the direction of flow. The velocity of a gaseous mixture passing into contact with a porous permeable membrane through a conduit of continuously decreasing cross section is maintained at a relatively constant velocity and back diffusion of said gas countercurrent to said continuous streaming is substantially prevented. However, this type of holder has proved unsatisfactory when used to test the separation efficiency of a membrane sample for both easily separable gaseous mixtures and difficultly separable isotopic mixtures, because correlation of the test results obtained for these two types of gas mixtures is extremely difficult. Such correlation is important because, in the production of large quantities of membrane for use in a diffusion separation plant, continuous control is necessary over the quality of the membrane produced and the separation efficiency thereof. It has been found preferable in carrying out such tests to employ mixtures of gases which may be easily separated by diffusion separation methods because of the relative simplicity of carrying out such tests as compared with testing membranes for difficultly separable and corrosive isotopic mixtures such as uranium hexafluoride. However, it is desirable to correlate the inert gas tests with the highly corrosive uranium hexafluoride tests in order that operation of membranes in a uranium hexafluoride diffusion plant may be predicted from inert gas tests. In addition to the difficulty of correlating results obtained from tests employing holders having channels of continuously decreasing cross section, such holders are difficult to construct, and a long period of time is necessary in order to complete a single test.

It is accordingly an object of the present invention to provide a high cut method and apparatus for testing the separating efficiency of porous permeable membranes.

It is another object of the present invention to provide an improved method and apparatus for separating the components of a difficultly separable gaseous mixture by diffusion through a finely porous, permeable membrane.

It is still another object of the invention to provide a method and apparatus for diffusion separation which is capable of producing improved separation of the components of the gaseous mixture in a single stage.

It is a further object of the present invention to provide a separative method of this character which is operative with a relatively small quantity of the gaseous mixture.

A still further object of the present invention is to provide a method and apparatus useful in the separation of difficultly separable highly corrosive gaseous mixtures and of easily separable inert gaseous mixtures, the relation of the separation effected being easily correlatable.

Other objects of this invention will be in part obvious and in part pointed out hereinafter.

In one of its broader aspects the method of the present invention comprises causing a stream of a gaseous mixture to flow into contact with one face of a finely porous permeable membrane causing a major fraction of the mixture to diffuse through the membrane, maintaining a generally rectangular cross section of the gaseous stream so flowing past said membrane, providing for said stream a predetermined relative length, width, and depth, continuously recirculating the gas that diffuses through said membrane, continuously withdrawing the gas that does not diffuse through said membrane, and continuously introducing a mass of gas into said continuously recirculated gas stream, said mass being equivalent to the mass of gas which does not diffuse through said membrane and which is withdrawn.

Apparatus suitable for carrying out the method of the present invention is illustrated in the accompanying drawings wherein:

FIG. 1 is a diagrammatic illustration of a continuous recycle system embodying the present method.

FIG. 2 is an isometric view, in part cut away, of a diffusion separation holder.

FIGS. 3A and 3B are a cross section of a holder and of a detail thereof.

FIG. 4 is a plan view of the base of the membrane holder.

Figure 5:
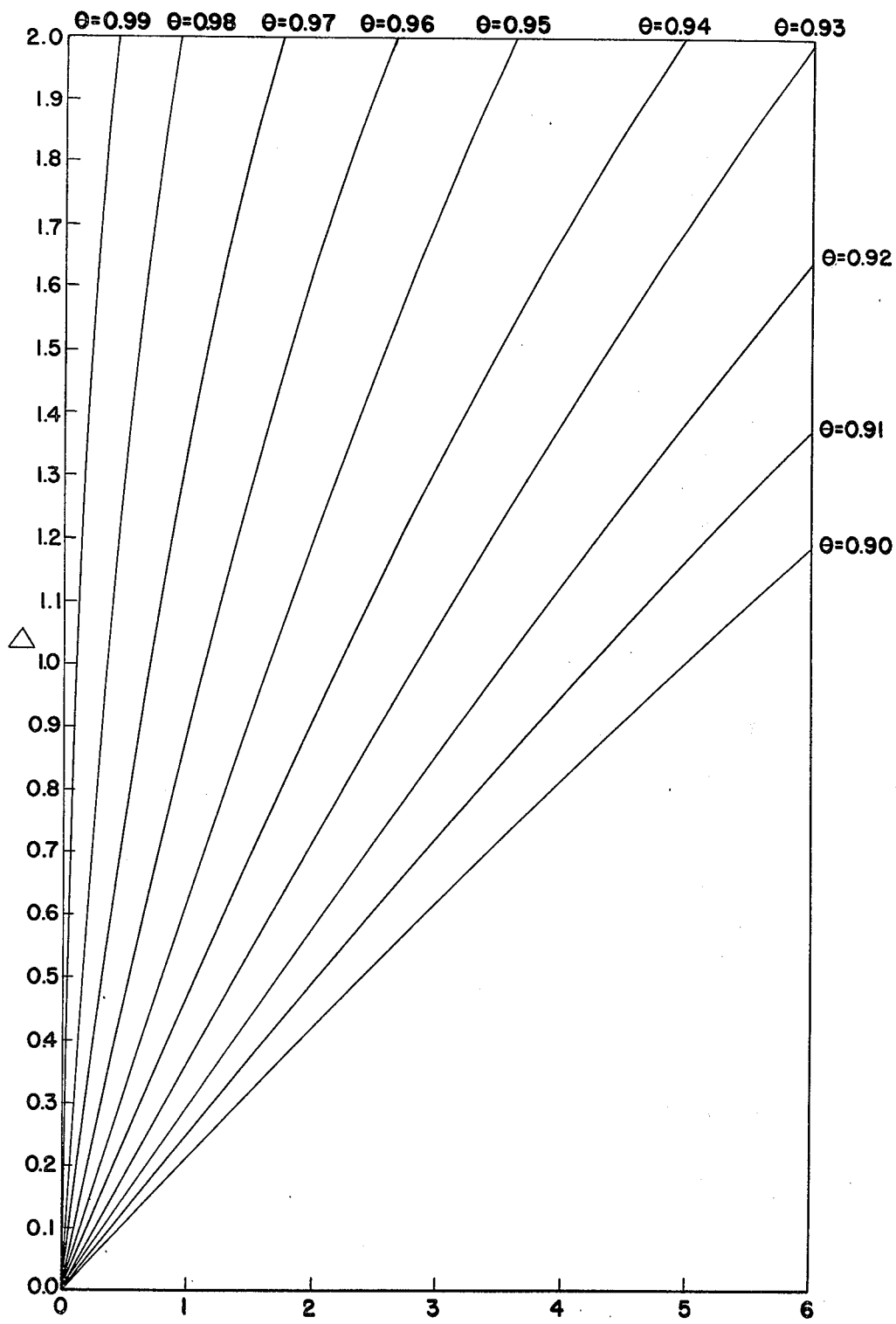
FIG. 5 is a plot of the relation between the cut $\theta$, the back diffusion correction $\Delta$, and a factor, $\beta$, which is a function of flow conditions, gas composition and channel size in said holder.

The apparatus shown in the accompanying drawings is particularly adapted for use in separating the isotopic species of uranium hexafluoride and will be illustratively described as applied to that problem.

Referring now to FIG. 1 of the drawings, this figure illustrates a continuous recycle system. In accordance with a preferred embodiment of the present method, a gaseous mixture is fed continuously through a pipe 80 to a diffuser-separator unit 82 having a high pressure chamber 84 and low pressure chamber 86 with a finely porous permeable membrane 88 therebetween. Gas entering the diffusion unit 82 through pipe 80 flows across the face of membrane 88 and thence through pipe 90 to a condenser 92 where it is condensed. The conditions upstream of the diffusion unit 82 are so maintained that only a small fraction of the gaseous mixture entering the unit 82 leaves through the pipe 90, the major portion of the entering gas being diffused through the membrane 88 into the low pressure chamber 86. The gas that thus diffuses into the chamber 86 is continuously re-circulated through pipe 154, pump 96 and pipe 98 to the feed pipe 80. From pipe 154 a branch pipe 100 leads to a condenser 102. Shutoff valves 104, 106, 108, 110 and 112 are provided in pipes 80, 90, 100, 94 and 98, respectively and flowmeters 81, 91 and 99 are provided in pipes 80, 90 and 98, respectively for measuring the gas flows in these pipes.

When used to determine the separating efficiency of a finely porous, permeable membrane the operation of the continuous system of FIG. 1 is as follows: Shutoff valves 104, 106 and 108 are initially opened and shutoff valves 110 and 112 initially closed. Process gas is continuously supplied through pipe 80 to the diffuser-separator unit 82 and the major portion of the gas supplied is caused to diffuse through the membrane 88 and pass through pipe 100 to the condenser 102. The undiffused gas constituting a small fraction of the gas fed to the unit 82 passes through pipe 90 to a condenser 92 where it is condensed until a sufficient quantity of material has collected in the condenser to provide a sample for analysis. The sample is removed and analyzed and condenser 92 is connected into the system again. The diffused gas in condenser 102 is returned to the system with valve 110 open; valve 108 is then closed and valve 112 opened to permit pump 96 to re-circulate the diffused gas through the feed pipe 80. The gas flow through pipe 80 into the diffuser unit 82 is continued at a constant rate and it is apparent that under these conditions the composition of the gas leaving diffuser unit 82 through pipe 90 will after a time reach an equilibrium such that it is equal to the composition of the feed gas. When equilibrium has been established a sample of the gas flowing through the pipe 154 is withdrawn through pipe 100 and condensed in the condenser 102 from which it is removed for analysis.

The initial sample collected in condenser 92 is relatively rich in the heavier constituent of the mixture and the fraction collected in condenser 102 after equilibrium has been established is enriched with respect to the lighter constituent of the mixture. Thus there is a substantial difference in composition between these two fractions that may be easily determined by analysis. When operating under standard conditions the difference in composition between the initial sample and final sample gives a measure of the separating efficiency of the membrane.

A membrane holder suitable for use according to a preferred embodiment of the method of the present invention is illustrated in FIGS. 2, 3A, 3B and 4. A channel or high pressure chamber 120 of suitable dimensions is formed in a base 122. A porous permeable membrane 124 is placed over the channel 120 and a seal is formed between the membrane 124 and the base 122 at the membrane perimeter by means of gasket 126. An entrance slot 128 and an exit slot 130 are provided at the ends of the channel 120. The plane of said channels 128 and 130 intersect the plane of the surface of channel 120 at an angle of 45°. The slot 128 terminates in a conduit 132, which conduit is connected to conduit 80. Similarly, slot 130 terminates in conduit 134 which is connected to conduit 90. The slot 130 has a width and depth approximately equal to that of the channel 120. In order to form slots of these small dimensions, it has been found preferable to form larger slots in the base 122 and then reduce the size of these larger slots by the insertion of keys 136 and 138 in the larger slots, the smaller slots 130 and 128 respectively being formed.

The membrane 124 is held in place by retaining plate 140. Holes 142 are provided in plate 140 to allow the passage of gas therethrough. Pressure is established between the plate 140 and base 122 by means of bolts 144 positioned in bolt-receiving recesses 146 in plate 140 and threaded into base 122 through taps 148. The perimeter of the upper surface of the membrane 124 is sealed to plate 140 by means of gasket 150. Cap 152, in combination with base 122, forms an enclosure into which gas, which has diffused through membrane 124 and plate 142, may pass. Conduit 154 in cap 152 provides an exit for the diffused gas fraction. The cap 152 is bolted to base 122 by means of bolts 156. A seal is formed between the enclosure formed by base 122 and cap 152 and the atmosphere outside this enclosure by means of gasket 158 which is pressed into groove 160 by tongue 162. A pressure tap 164 is centrally located in the channel 120. The tap is connected to pressure measuring means or gas sample collecting means through conduit 166 in base 122. FIG. 3B is a detailed enlargement of a portion of FIG. 3A. The key 138 is retained in its position in the larger slot of the base 120 by ledge 170. Grooves 172 are formed in the portion of plate 140 which is in contact with or adjacent to membrane 124. The plate 140 prevents the deflection of the membrane 124 beyond the predetermined limits set by the predetermined relation of length, width, and depth. The grooves 172 enable diffused gaseous mixture to pass freely through the membrane 124 as they provide passages for the flow of gas on the diffused gas side of the membrane.

It has been found that, when the fraction T of the total input gas F, which diffuses through the membrane, is relatively large, as in the case of a high cut procedure, the velocity of the gas stream flowing into contact with the membrane drops and a large pressure gradient exists through the length of said stream. Such a gradient induces back diffusion and thereby decreases the overall diffusion separation obtained. The reduction in velocity as the mass flow is reduced is the principal cause of the increase in back diffusion. Corrections can be made for back diffusion but it has been found that when these corrections are in excess of two percent they are not accurate and the accuracy of the separation efficiency determination that is obtained from diffusion separation tests wherein the back diffusion correction is in excess of two percent is correspondingly inaccurate. In accordance with the present invention the diffusion correcton is kept below two percent by maintaining the dimensions of the channel through which the gaseous mixture passes within a predetermined relation. The relation is given by the expression $$\beta = \theta^2 \frac{D\rho}{T} \left( \frac{HW}{L} \right)$$

where $\theta$ is the cut which is equivalent to the ratio of the mass of gas ($T$) transmitted through the membrane to the mass of gas ($F$) flowed into contact with the membrane, $D$ is the diffusion constant of the gas used,
$\rho$ is the density of said gas,
$T$ is the mass of gas that is transmitted through the membrane,
$H$ is the channel depth,
$W$ is the channel width, and
$L$ is the channel length.

Referring to FIG. 5 when a relation of H, W, and L, for a particular gas used, gives a value of beta and theta such that the corresponding delta is less than two, such a relation of H, W, and L is satisfactory for use according to the method of the present invention. For example, when the isotopes of uranium hexafluoride are separated by gaseous diffusion in a system such as is diagrammatically illustrated in FIG. 1 and a holder similar to that illustrated in FIGS. 2, 3A, 3B and 4 is used, a channel 120 having a height of 0.038 centimeters, a width of 3.81 centimeters and a length of 10.80 centimeters has been found suitable. The product of the density and diffusion constant of uranium hexafluoride at 60°C. is $2.7 \times 10^{-4}$. A theta of 0.93 and a T of 1/90 grams per second were chosen. That these dimensions and values satisfy the beta-theta-delta relation plotted in FIG. 5 may be demonstrated by substituting them in the equation for beta. $\beta \times 10^4$ is found to have a value of 2.83 for these values.

From FIG. 5 it may be seen that the ordinate corresponding to a $\beta \times 10^4 = 2.83$ and a $\theta = 0.93$ is a $\Delta$ value of 1.05. $\Delta$ is approximately equivalent to the percent correction in the separation efficiency determination. A diffusion separation efficiency testing system, having the foregoing dimensions, was operated very satisfactorily with uranium hexafluoride using the aforementioned values of $\Delta$, $\rho$, $\theta$, and T. The system was also used in testing the separation efficiency of membranes with relatively inert, easily separable, gaseous mixtures, such as He, $CO_2$ mixtures, and very satisfactory, relatively simple correlations between the separation efficiency determinations were made.

It will be understood that other values of $\theta$ or dimensions of the channel may be chosen such that the $\beta$, $\theta$, $\Delta$, relation within the limits plotted in FIG. 5, is maintained. It will also be understood that the method may be employed in separating other mixtures of gases or gaseous isotopes, either corrosive or non-corrosive, and the results of these determinations may be relatively easily correlated. The method of the present invention may be used to particular advantage in testing membranes with inert, relatively easily separable, gaseous mixtures such as He and $CO_2$, and in predicting separation efficiency of membranes when used with uranium hexafluoride or other corrosive gases on the basis of the inert gas tests.

Since many embodiments might be made of the above described invention and since many changes might be made in the embodiment illustratively disclosed herein, it is to be understood that all matter hereinabove set forth is to be interpreted as illustrative only and not in a limiting sense, except as may be required by the appended claims.

We claim:

1. The method of testing the separation efficiency of porous permeable membranes which comprises causing a stream of a gaseous mixture to flow into contact with one face of a finely porous permeable membrane under such conditions that a major fraction of the mixture diffuses through the membrane, maintaining a rectangular cross section of the gaseous stream so flowing past said membrane, continuously recirculating the gas that diffuses through said membrane and continuously withdrawing the gas that does not diffuse through said membrane and maintaining the volume of said recirculating gas constant by continuously introducing into said continuously recirculating gas stream a mass of gas equivalent to that which is continuously withdrawn from said gas stream and comparing the concentrations of the light component in the entering gas, the withdrawn gas and the recirculated gas in order to determine the efficiency of said membrane.

2. The method of diffusively separating the components of a gaseous mixture which comprises causing a stream of a gaseous mixture to flow into contact with one face of a finely porous permeable membrane, causing a major fraction of the mixture to diffuse through the membrane, maintaining a rectangular cross section of the gaseous stream so flowing into contact with said membrane, withdrawing the gas that does not diffuse through said membrane, and combining the gas which diffuses through the membrane with a stream of gaseous mixture flowing into contact with said membrane, said flowing gaseous mixture with which said diffused gas is combined having a mass flow equivalent to the mass flow of the withdrawn gas.

3. The method of diffusively separating the components of a gaseous mixture which comprises causing a stream of a gaseous mixture to flow into contact with the face of a finely porous permeable membrane, causing a major fraction of the mixture to diffuse through the membrane, maintaining a rectangular cross section of the gaseous stream so flowing into contact with said membrane, providing for said stream a depth of 0.038 centimeters, a width of 3.18 centimeters and a length of 10.80 centimeters, withdrawing the gas which does not diffuse through said membrane, combining the gas which diffuses through the membrane with a stream of gaseous mixture flowing into contact with said membrane, thereby recirculating said diffused gas into contact with said porous permeable membrane, the flowing mixture with which said diffused gas is combined having a mass flow equivalent to the mass flow of the withdrawn gas.

4. The method of testing the separation efficiency of porous permeable membranes which comprises causing a stream of a gaseous mixture to flow into contact with the face of a finely porous permeable membrane, causing a major fraction of the mixture to diffuse through the membrane, maintaining a rectangular cross section of the gaseous stream so flowing into contact with said membrane, providing for said stream a depth of 0.038 centimeters, a width of 3.18 centimeters and a length of 10.80 centimeters, withdrawing the gas which does not diffuse through said membrane, combining the gas which diffuses through the membrane with a stream of gaseous mixture flowing into contact with said membrane, thereby recirculating said diffused gas into contact with said porous permeable membrane, the flowing mixture with which said diffused gas is combined having a mass flow equivalent to the mass flow of the withdrawn gas, and comparing the concentrations of the light component in the entering gas, in the withdrawn gas and in the recirculating gas, thereby determining the efficiency of said membrane.

* * * * *